US009303663B2

(12) United States Patent
Greenamyer et al.

(10) Patent No.: US 9,303,663 B2
(45) Date of Patent: Apr. 5, 2016

(54) LOCKING RAIL ALIGNMENT SYSTEM (71) Applicants: Michael G. Greenamyer, Youngstown, OH (US); Greg Huzyak, Salem, OH (US)

(72) Inventors: Michael G. Greenamyer, Youngstown, OH (US); Greg Huzyak, Salem, OH (US)

(73) Assignee: Northern States Metals Company, Youngstown, OH (US)

( * ) Notice: Subject to any disclaimer, the term of this patent is extended or adjusted under 35 U.S.C. 154(b) by 116 days.

(21) Appl. No.: 14/250,496

(22) Filed: Apr. 11, 2014

(65) Prior Publication Data

US 2014/0305896 A1    Oct. 16, 2014

Related U.S. Application Data (60) Provisional application No. 61/810,751, filed on Apr. 11, 2013.

(51) Int. Cl.
*F16B 2/20* (2006.01)
*F24J 2/52* (2006.01)

(52) U.S. Cl.
CPC ............... *F16B 2/20* (2013.01); *F24J 2/5232* (2013.01); *F24J 2/5258* (2013.01); *F24J 2002/5213* (2013.01); *Y02E 10/47* (2013.01)

(58) Field of Classification Search
CPC ......... Y02E 10/47; Y02E 10/50; Y02E 10/52; H02S 20/00; H02S 20/10; H02S 20/20; H02S 20/22; H02S 20/23; H02S 20/32; F16B 2/20; F24J 2/5232; F24J 2/5258; F24J 2002/5213

USPC .......... 211/41.1; 136/244, 251; 126/621, 622, 126/623
See application file for complete search history.

(56) References Cited

U.S. PATENT DOCUMENTS

| | | | |
|---|---|---|---|
| 1,893,481 A | 1/1933 | Adams |
| 1,988,647 A | 1/1935 | Emerson |
| 2,673,632 A | 3/1954 | Stiranka |
| 2,938,068 A | 5/1960 | Silverschotz |
| 3,028,938 A | 4/1962 | Schorr |
| 3,062,339 A | 11/1962 | Geyser |
| 3,092,932 A | 6/1963 | Wilson |

(Continued)

FOREIGN PATENT DOCUMENTS

| | | |
|---|---|---|
| CN | 1900458 A | 1/2007 |
| CN | 101095017 A | 12/2007 |

(Continued)

OTHER PUBLICATIONS

Krannich Solar, Inc. K-2 Systems, Mounting Systems for Solar Technology (7pages); website: http//cms.krannich-solar.com/usa/upload/pdf/K2/image_K2_USA_VIEW.pdfl; publication date unknown.

(Continued)

*Primary Examiner* — Patrick Hawn
(74) *Attorney, Agent, or Firm* — Roth, Blair, Roberts, Strasfeld & Lodge (57) ABSTRACT

In a panel support array constituted by lower support joists and upper panel rails in a two-tier, two-dimensional arrangement, the array is aligned through the use of V-shaped locking rails extending through apertures in adjacent upper panel rails. The V-shaped locking rails are configured so as to lock at each of the upper panel rails through which the V-rail passes. As a result, the overall support array remains aligned in the proper position despite environmental variations.

17 Claims, 9 Drawing Sheets

(56) References Cited

U.S. PATENT DOCUMENTS

| | | | |
|---|---|---|---|
| 3,210,716 A | 10/1965 | Meacham | |
| 3,261,086 A | 7/1966 | Dunn | |
| 3,844,087 A | 10/1974 | Schultz et al. | |
| 4,006,731 A | 2/1977 | Carroll | |
| 4,114,595 A | 9/1978 | Barker | |
| 4,146,785 A | 3/1979 | Neale | |
| 4,159,604 A | 7/1979 | Burrell | |
| 4,162,595 A | 7/1979 | Ramos et al. | |
| 4,258,963 A | 3/1981 | Fusselman et al. | |
| 4,269,173 A | 5/1981 | Krueger et al. | |
| 4,278,072 A | 7/1981 | Ryan et al. | |
| 4,328,789 A | 5/1982 | Nelson | |
| 4,418,506 A | 12/1983 | Weber et al. | |
| 4,426,999 A | 1/1984 | Evans et al. | |
| 4,452,027 A | 6/1984 | Desai | |
| 4,452,234 A | 6/1984 | Withjack | |
| 4,466,424 A | 8/1984 | Lockwood, Jr. | |
| 4,580,385 A | 4/1986 | Field | |
| 4,584,427 A | 4/1986 | Mackamul et al. | |
| 4,658,559 A | 4/1987 | Doherty | |
| 4,680,905 A | 7/1987 | Rockar | |
| 4,721,555 A | 1/1988 | Grosshandler | |
| 4,789,070 A | 12/1988 | Bennett | |
| 4,850,167 A | 7/1989 | Beard et al. | |
| 4,892,632 A | 1/1990 | Morris | |
| 4,930,493 A | 6/1990 | Sallis | |
| 4,966,631 A | 10/1990 | Matlin et al. | |
| 4,977,646 A | 12/1990 | McCraw | |
| 5,125,608 A * | 6/1992 | McMaster | F24J 2/5232 126/570 |
| 5,143,556 A | 9/1992 | Matlin | |
| 5,228,258 A | 7/1993 | Onoda et al. | |
| 5,232,518 A | 8/1993 | Nath et al. | |
| 5,251,415 A | 10/1993 | Van Auken et al. | |
| 5,299,396 A | 4/1994 | Raap et al. | |
| 5,308,037 A | 5/1994 | Gonzalez | |
| 5,317,145 A | 5/1994 | Corio | |
| 5,487,791 A | 1/1996 | Everman et al. | |
| 5,546,713 A | 8/1996 | Voegele et al. | |
| 5,564,346 A | 10/1996 | Robben | |
| 5,632,823 A | 5/1997 | Sharan | |
| 5,634,644 A | 6/1997 | Guillon | |
| 5,664,874 A | 9/1997 | Winterer | |
| 5,706,617 A | 1/1998 | Hirai et al. | |
| 5,735,100 A | 4/1998 | Campbell | |
| 5,762,720 A | 6/1998 | Hanoka et al. | |
| 5,905,229 A | 5/1999 | McKitrick et al. | |
| 5,946,874 A | 9/1999 | Roberts | |
| 5,969,501 A | 10/1999 | Glidden et al. | |
| 5,979,364 A | 11/1999 | Ricketts | |
| 5,986,203 A | 11/1999 | Hanoka et al. | |
| 6,046,399 A | 4/2000 | Kapner | |
| 6,056,283 A | 5/2000 | Gage et al. | |
| 6,065,255 A * | 5/2000 | Stern | E04D 3/3608 52/173.3 |
| 6,111,189 A | 8/2000 | Garvison et al. | |
| 6,141,923 A | 11/2000 | Habicht et al. | |
| 6,269,596 B1 | 8/2001 | Ohtsuka et al. | |
| 6,345,796 B1 | 2/2002 | Neuman | |
| 6,360,491 B1 | 3/2002 | Ullman | |
| 6,370,828 B1 | 4/2002 | Genschorek | |
| 6,389,770 B1 | 5/2002 | Santavicca | |
| 6,431,193 B2 | 8/2002 | Carter | |
| 6,501,013 B1 | 12/2002 | Dinwoodie | |
| 6,617,507 B2 | 9/2003 | Mapes et al. | |
| 6,672,018 B2 | 1/2004 | Shingleton | |
| 6,722,357 B2 | 4/2004 | Shingleton | |
| 6,784,359 B2 | 8/2004 | Clark et al. | |
| 6,799,398 B1 | 10/2004 | Plevyak | |
| 6,814,070 B2 | 11/2004 | Bourne et al. | |
| 6,920,721 B2 | 7/2005 | Johns et al. | |
| 6,959,517 B2 | 11/2005 | Poddany et al. | |
| 6,988,344 B1 | 1/2006 | Krueger | |
| 7,012,188 B2 | 3/2006 | Erling | |
| 7,082,685 B2 | 8/2006 | Crean | |
| 7,109,461 B2 | 9/2006 | Lasich | |
| 7,260,918 B2 | 8/2007 | Liebendorfer | |
| 7,307,209 B2 | 12/2007 | Mapes et al. | |
| 7,340,832 B2 | 3/2008 | Crean | |
| D565,505 S | 4/2008 | Shugar et al. | |
| 7,406,800 B2 | 8/2008 | Cinnamon et al. | |
| 7,434,362 B2 | 10/2008 | Liebendorfer | |
| 7,435,134 B2 | 10/2008 | Lenox | |
| 7,435,897 B2 | 10/2008 | Russell | |
| 7,476,832 B2 | 1/2009 | Vendig et al. | |
| 7,478,931 B2 | 1/2009 | Miletich et al. | |
| D586,737 S | 2/2009 | Shugar et al. | |
| 7,531,741 B1 | 5/2009 | Melton et al. | |
| 7,552,513 B2 | 6/2009 | Cheng | |
| 7,554,030 B2 | 6/2009 | Shingleton | |
| 7,557,292 B2 | 7/2009 | Shingleton et al. | |
| 7,600,350 B2 | 10/2009 | Braunstein | |
| 7,721,492 B2 | 5/2010 | Plaisted et al. | |
| 7,780,472 B2 | 8/2010 | Lenox | |
| 7,807,918 B2 | 10/2010 | Shingleton et al. | |
| 7,832,157 B2 | 11/2010 | Cinnamon | |
| 7,836,879 B2 | 11/2010 | Mackamul | |
| 7,845,120 B2 | 12/2010 | Thome et al. | |
| 7,866,098 B2 | 1/2011 | Cinnamon | |
| 7,888,587 B2 | 2/2011 | Shingleton et al. | |
| 7,888,588 B2 | 2/2011 | Shingleton | |
| 7,915,519 B2 | 3/2011 | Kobayashi | |
| 7,939,754 B2 | 5/2011 | Richter et al. | |
| 7,956,280 B2 | 6/2011 | Kobayashi | |
| 7,958,886 B2 | 6/2011 | Barsun et al. | |
| 7,987,641 B2 | 8/2011 | Cinnamon | |
| 8,037,658 B2 | 10/2011 | Kundel et al. | |
| 8,065,841 B2 | 11/2011 | Antonic | |
| 8,101,849 B2 | 1/2012 | Almy et al. | |
| 8,148,627 B2 | 4/2012 | Rose et al. | |
| 8,156,707 B2 | 4/2012 | Kundel et al. | |
| 8,158,877 B2 | 4/2012 | Klein et al. | |
| 8,176,693 B2 | 5/2012 | Abbott et al. | |
| 8,230,850 B2 | 7/2012 | Barnsun et al. | |
| 8,240,109 B2 | 8/2012 | Cusson et al. | |
| 8,245,459 B2 | 8/2012 | Belikoff et al. | |
| 8,245,549 B2 | 8/2012 | Zagoroff | |
| 8,256,169 B2 | 9/2012 | Cusson et al. | |
| 8,316,590 B2 | 11/2012 | Cusson | |
| 8,407,895 B2 | 4/2013 | Hartelius et al. | |
| 8,407,950 B2 | 4/2013 | Hartelius | |
| 8,413,312 B2 | 4/2013 | Hartelius et al. | |
| 8,413,388 B2 | 4/2013 | Stearns et al. | |
| 8,413,944 B2 | 4/2013 | Harberts et al. | |
| 8,413,946 B2 | 4/2013 | Hartelius et al. | |
| 8,418,983 B2 | 4/2013 | Hartelius et al. | |
| 8,418,984 B2 | 4/2013 | Hartelius et al. | |
| 8,540,109 B1 | 9/2013 | Mcpeek et al. | |
| 8,555,576 B2 | 10/2013 | Falk | |
| 8,936,164 B2 * | 1/2015 | Durney | F24J 2/5232 136/251 |
| 9,134,045 B2 * | 9/2015 | Ashmore | F24J 2/5232 |
| 9,163,861 B2 * | 10/2015 | Al-Haddad | F24J 2/525 |
| 9,166,521 B2 * | 10/2015 | Durney | F24J 2/5232 |
| 2002/0043812 A1 | 4/2002 | Crean | |
| 2002/0059948 A1 | 5/2002 | Carter | |
| 2002/0088905 A1 | 7/2002 | Hansen | |
| 2003/0015636 A1 | 1/2003 | Liebendorfer | |
| 2003/0019180 A1 | 1/2003 | Warren et al. | |
| 2003/0070368 A1 | 4/2003 | Shingleton | |
| 2003/0070705 A1 * | 4/2003 | Hayden | F24J 2/5232 136/251 |
| 2003/0097806 A1 | 5/2003 | Brown | |
| 2003/0101662 A1 | 6/2003 | Ullman | |
| 2004/0025466 A1 | 2/2004 | Hink et al. | |
| 2004/0048022 A1 | 3/2004 | Pratt | |
| 2004/0163338 A1 | 8/2004 | Liebendorfer | |
| 2004/0221518 A1 | 11/2004 | Westra | |
| 2004/0231274 A1 | 11/2004 | Engstrom | |
| 2005/0072103 A1 | 4/2005 | Hopwood | |
| 2005/0103376 A1 | 5/2005 | Matsushita et al. | |
| 2005/0218657 A1 | 10/2005 | Weesner et al. | |
| 2006/0071437 A1 | 4/2006 | Blasco | |
| 2006/0156651 A1 | 7/2006 | Genschorek | |

(56) References Cited

U.S. PATENT DOCUMENTS

| | | | |
|---|---|---|---|
| 2007/0069542 A1 | 3/2007 | Steiger et al. | |
| 2007/0151594 A1 | 7/2007 | Mascolo et al. | |
| 2007/0199196 A1 | 8/2007 | Crean | |
| 2007/0251567 A1 | 11/2007 | Plaisted | |
| 2008/0010915 A1 | 1/2008 | Liebendorfer | |
| 2008/0016818 A1 | 1/2008 | Heirich | |
| 2008/0053517 A1 | 3/2008 | Plaisted et al. | |
| 2008/0087275 A1* | 4/2008 | Sade | F24J 2/5235 126/623 |
| 2008/0087320 A1 | 4/2008 | Mapes et al. | |
| 2008/0172935 A1 | 7/2008 | Feng | |
| 2008/0172955 A1 | 7/2008 | McClintock et al. | |
| 2008/0223262 A1 | 9/2008 | Chew et al. | |
| 2008/0230047 A1 | 9/2008 | Shugar et al. | |
| 2008/0236058 A1 | 10/2008 | Antonie | |
| 2008/0264467 A1 | 10/2008 | Doko et al. | |
| 2008/0302407 A1 | 12/2008 | Kobayashi | |
| 2008/0302928 A1 | 12/2008 | Haddock | |
| 2009/0025708 A1 | 1/2009 | Shingleton | |
| 2009/0025710 A1 | 1/2009 | Hogan | |
| 2009/0031640 A1 | 2/2009 | Elmes et al. | |
| 2009/0032084 A1* | 2/2009 | Aiken | F24J 2/542 136/246 |
| 2009/0032090 A1* | 2/2009 | Kats | F24J 2/542 136/251 |
| 2009/0050191 A1 | 2/2009 | Young et al. | |
| 2009/0056698 A1 | 3/2009 | Johnson et al. | |
| 2009/0151775 A1 | 6/2009 | Pietrzak | |
| 2009/0159075 A1 | 6/2009 | Mackamul | |
| 2009/0205703 A1* | 8/2009 | Umotoy | F24J 2/5203 136/251 |
| 2009/0230265 A1 | 9/2009 | Newman et al. | |
| 2009/0256046 A1* | 10/2009 | Hausner | F24J 2/5232 248/398 |
| 2009/0302183 A1 | 12/2009 | Strizki | |
| 2010/0071996 A1 | 3/2010 | Huang | |
| 2010/0089389 A1 | 4/2010 | Seery et al. | |
| 2010/0089390 A1 | 4/2010 | Miros et al. | |
| 2010/0089433 A1 | 4/2010 | Conger | |
| 2010/0127142 A1 | 5/2010 | Genschorek | |
| 2010/0146899 A1 | 6/2010 | Zante | |
| 2010/0193012 A1 | 8/2010 | Klammer et al. | |
| 2010/0212715 A1 | 8/2010 | Almy et al. | |
| 2010/0217565 A1 | 8/2010 | Wayne et al. | |
| 2010/0217566 A1 | 8/2010 | Wayne et al. | |
| 2010/0217639 A1 | 8/2010 | Wayne et al. | |
| 2010/0217724 A1 | 8/2010 | Wayne et al. | |
| 2010/0236183 A1 | 9/2010 | Cusson et al. | |
| 2010/0237028 A1 | 9/2010 | Cusson | |
| 2010/0237029 A1 | 9/2010 | Cusson et al. | |
| 2010/0269446 A1 | 10/2010 | Merrifield | |
| 2010/0307991 A1 | 12/2010 | Belikoff et al. | |
| 2011/0072631 A1 | 3/2011 | Hartelus et al. | |
| 2011/0114153 A1 | 5/2011 | Almy et al. | |
| 2011/0120524 A1 | 5/2011 | Wares et al. | |
| 2011/0139145 A1 | 6/2011 | Mackamul | |
| 2011/0178641 A1 | 7/2011 | Judkins | |
| 2011/0203637 A1 | 8/2011 | Patton et al. | |
| 2011/0220180 A1 | 9/2011 | Cinnamon et al. | |
| 2011/0220596 A1 | 9/2011 | Cusson et al. | |
| 2011/0240006 A1 | 10/2011 | Linke et al. | |
| 2011/0284058 A1 | 11/2011 | Cinnamon | |
| 2012/0031862 A1 | 2/2012 | Belikoff et al. | |
| 2012/0036717 A1 | 2/2012 | Belikoff et al. | |
| 2012/0160234 A1 | 6/2012 | Wares et al. | |
| 2012/0180845 A1 | 7/2012 | Cole et al. | |
| 2012/0187058 A1 | 7/2012 | Almy et al. | |
| 2012/0223033 A1* | 9/2012 | Molek | F16B 7/18 211/41.1 |
| 2012/0272613 A1 | 11/2012 | Cusson et al. | |
| 2012/0298817 A1 | 11/2012 | West et al. | |
| 2013/0006465 A1 | 1/2013 | Berrios et al. | |
| 2013/0043199 A1 | 2/2013 | Cusson | |
| 2013/0091786 A1 | 4/2013 | DuPont et al. | |

FOREIGN PATENT DOCUMENTS

| | | |
|---|---|---|
| CN | 201014798 Y | 1/2008 |
| CN | 100424305 C | 10/2008 |
| CN | 101345269 | 1/2009 |
| CN | 201188591 Y | 1/2009 |
| CN | 201256369 Y | 6/2009 |
| CN | 201435696 | 3/2010 |
| CN | 201498521 | 6/2010 |
| CN | 201576689 | 9/2010 |
| CN | 201757526 | 3/2011 |
| CN | 101387151 | 5/2011 |
| DE | 4208519 | 9/1993 |
| EP | 0 993 051 A2 | 4/2000 |
| EP | 2 211 555 | 7/2010 |
| EP | 2 339 262 | 6/2011 |
| JP | 61199671 A | 9/1986 |
| JP | 02003534 A | 1/1990 |
| JP | 04146897 A | 5/1992 |
| WO | WO 97/19291 A1 | 5/1997 |
| WO | WO 2006/072230 | 7/2006 |
| WO | WO 2008/124158 | 10/2008 |
| WO | WO 2008/145903 | 12/2008 |
| WO | WO 2009/015424 | 2/2009 |
| WO | WO 2009/146511 | 12/2009 |
| WO | WO 2010/045514 | 4/2010 |
| WO | WO 2010/053029 | 5/2010 |
| WO | WO 2010/057781 | 5/2010 |
| WO | WO 2010/064656 | 6/2010 |
| WO | WO 2010/107419 | 9/2010 |
| WO | WO 2010/107466 | 9/2010 |
| WO | WO 2010/130720 | 11/2010 |
| WO | WO 2011/016498 | 2/2011 |
| WO | WO 2011/023902 | 3/2011 |
| WO | WO 2011/029758 | 3/2011 |
| WO | WO 2011/123740 | 10/2011 |

OTHER PUBLICATIONS

First Solar Inc.; FS3X5 Installation Instruction Manual No. SD-2-02104001, Rev 1 (13 pages) with David Bohling Engineer CAD drawing (6 pages); website: www.firstsolar.com; publication date unknown.

Schletter Solar Mounting Systems Mounting and Project Planning, Schletter Inc., Manual [online], Mar. 10, 2010 [retrieved on Oct. 31, 2011]. Retrived from the internet: URL:http://www.scheltter.us/support/Mounting%20and%20proje.

Legrand Solar; website: www.legrand.us/cableofil; Advertisement "Ground Mount PV Supports" Retrieved from the internet: http://www.legrand.us/search.aspx?q=ground mount pv supports&r=0.30885281458029534 Resourses PDF.

* cited by examiner

LOCKING RAIL ALIGNMENT SYSTEM

PRIORITY DATA

The present application claims priority to U.S. Provisional Patent Application No. 61/810,751 filed Apr. 11, 2014.

FIELD OF THE INVENTION

The present invention is generally related to the field of support systems. In particular, the present invention is directed to an alignment system for panel support systems.

BACKGROUND OF INVENTION

There are many varieties of different panel support matrices. Each type of panel support matrix or system requires particular techniques and equipment for assembling and aligning the structural members of the support matrix. Further, each type of panel support matrix must be integrated with the overall support system. The various techniques for assembling and aligning vary with the materials constituting the support matrix and the overall support system in which the support matrix is used. Of particular interest is the support and alignment of solar panel support, materials and underlying support systems.

A major problem with panel support matrices and overall support systems is the expense incurred in assembling a support system so that it can quickly accommodate panels, such as solar panels. Another major problem is ensuring that the support system is properly aligned so that the panels supported thereby are also properly aligned. This is particularly important when the panels being supported are solar panels. Besides being a major expenditure, mounting the panels is critical due to the fragility of the solar panels themselves, which are easily compromised in a number of different ways. Of special interest is the arrangement of the support structure, preferably a two tier, two dimensional matrix of structural elements.

While there are techniques for properly aligning two crossing connected structural elements with respect to each other, there is very little in the way of arrangements for properly aligning all of the structural elements on a matrix as a complete system. Consequently, it is now usual for a certain amount of misalignment in the structural elements of the support matrix to occur, even if individual pairs of structural elements have been properly aligned.

Overall matrix misalignment can continue even though a number of panels have been mounted upon the support matrix. Eventually, the misalignment becomes reinforced by the mounting of some panels. As a result later panels cannot be properly mounted.

This condition is caused by even slight deformations in the support matrix structural members occurring during handling and transport. It is further exacerbated by environmental considerations which may cause substantial warping of the overall support system during installation of the panels. Very often, panels that have been installed act as "sails" further deforming the overall support matrix, and rendering the precise placement of additional panels to be very problematical. Accordingly, there is a need in the panel support installation technology for a system to properly align and hold support matrix members so that the entire support matrix can be properly aligned for panel installation.

SUMMARY OF THE PRESENT INVENTION

Accordingly, it is an overall object of the present invention to overcome existing drawbacks in panel support systems, and the installation of both the panel support systems and the panels supported thereby.

A first object of the present invention is to provide an alignment system that will align and hold a panel support matrix in its entirety for the installation of panels.

It is another object of the present invention to provide an alignment system that requires no additional hardware to install on a panel support matrix.

It is further an object of the present invention to provide an alignment system that prevents deformation misalignment of a panel support matrix due to environmental conditions acting on both installed panels and the panel support matrix.

It is an additional object of the present invention to provide a panel support matrix alignment system that holds tightly to the support elements of the panel support matrix under all conditions.

It is still another object of the present invention to provide an alignment system for a panel support matrix that utilizes the strength of the support elements of the matrix to maintain proper alignment.

It is yet a further object of the present invention to provide an alignment system for a panels support matrix, wherein alignment of an entire support matrix section can be achieved by a single piece of alignment locking rail.

It is again an additional object of the present invention to provide an alignment system for a panel support matrix, wherein the alignment system is easily extended so that additional alignment support can easily be provided to any panel support matrix.

It is still another object of the present invention to provide a panel support matrix alignment system that optimizes the use of particular structural elements within the support matrix.

It is yet another object of the present invention to provide an alignment system for a panel support matrix in which the upper panel rails can be made in a uniform manner to interface with the alignment system.

It is again an additional object of the present invention to provide an alignment system for a panel support matrix in which additional alignment members can be easily added to accommodate changing environmental conditions.

It is still another object of the present invention to provide an alignment system for a panel support matrix, including clips that optimize the connection, alignment and support of panels to be connected to the matrix.

It is yet a further object of the present invention to provide an alignment system for a panel support matrix which is configured to facilitate ease of connecting both panels and panel clamps or panels clips.

It is again an additional object of the present invention to provide an alignment system for a panel support matrix, in which panel clips serve as alignment mechanisms for the panels.

These and other goals and objects of the present invention are achieved by a panel support matrix alignment system comprising a V-shaped alignment locking rail. The alignment locking rail is provided with locking notches to interface with double-v-shaped apertures in perpendicular surfaces of panel support matrix elements.

DETAILED DESCRIPTION OF THE PREFERRED EMBODIMENTS

Figure 1A:
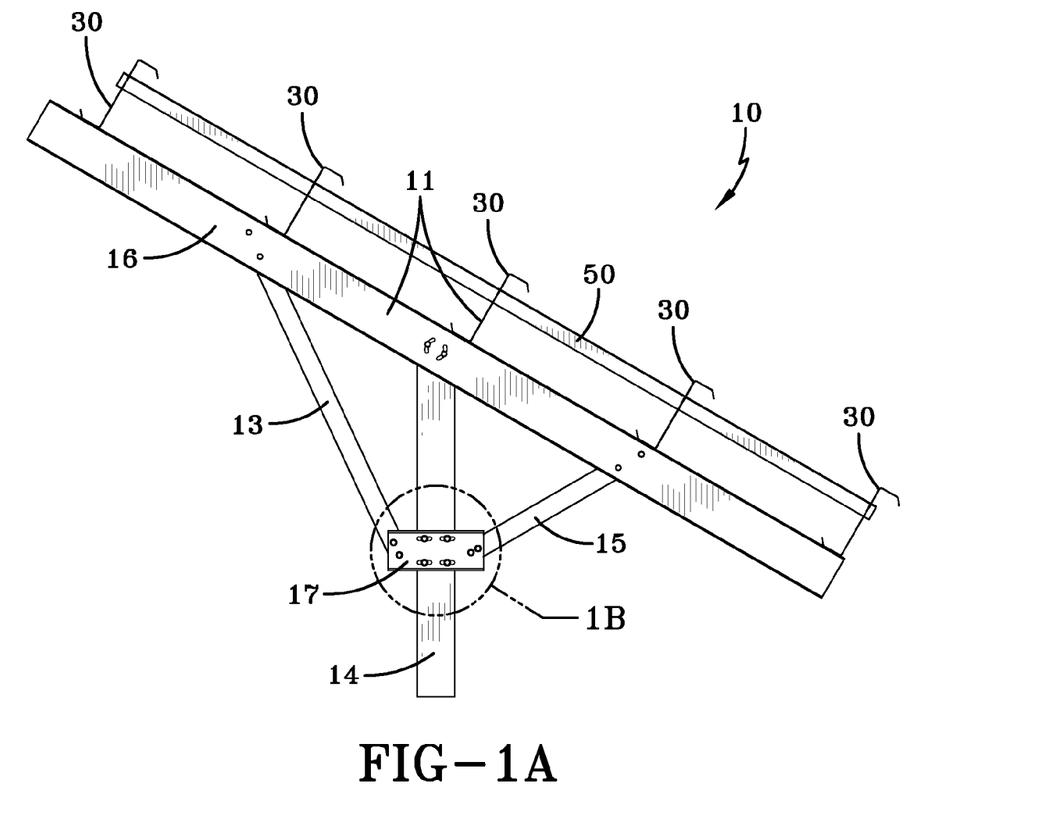
FIG. 1A is a side view of the environment in which the present invention operates.

FIG. 1A is a side view of an overall, support system 10 which is used to support a two-dimensional, two-tier panel support matrix 11. The overall support system 10 includes a vertical support 14, horizontal interface 17 and bracing members 13 and 15. All of these are used to support panel support matrix 11, which in this instance includes a plurality of tilt brackets 16, supporting upper panel rails 30. Also, depicted in FIG. 1A is a key feature of the present invention, alignment locking rail 50, which passes through apertures in multiple upper panel rails 30.

Figure 1B:
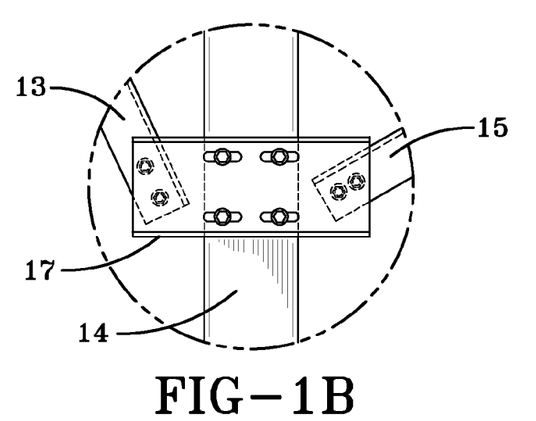
FIG. 1B is a detailed view of one portion of FIG. 1A.

FIG. 1B is a detailed view of the horizontal interface 17, which is connected to vertical support member 14 to provide mechanical attachment for bracing members 13 and 15. Both of these bracing members (13, 15) are designed to help support the tilt bracket 16, which in turn supports the upper panel rails 30 (as depicted in FIG. 1A).

It should be understood that the vertical support 14 can be any appropriate structural member that has the capability of supporting the weight (including additional stresses caused by environmental considerations such as wind) of the panels support matrix 11 and the weight of the panels supported thereby. In the current embodiment vertical support 14 is a circular pole embedded in a concrete base (not shown). Horizontal support interface 17 is held to the circular pole 14 using annular bolts (not shown) that pass through horizontal interface 17, and are connected thereto by means of nuts on threaded portions of the annular connectors.

It should be understood that horizontal support interface 17 can be configured in any way necessary to match the particular vertical support 14 existing at a particular installation site to accommodate the support matrix 11. Likewise, it should also be understood that the tilt brackets 16 (C-channels in the depicted embodiments) can be preinstalled at the site before placement of the rest of the support matrix, constituted by the upper panel rails 30. In the alternative, tilt bracket 16 can be preassembled with upper panel rails 30 as a lower support joist, and shipped in a folded or partially attached configuration to the installation site to be connected to the upright supports 14 and the bracing members 13, 15.

When the tilt bracket 16 is preinstalled before the rest of the support matrix 11, additional variations can be accommodated. In particular, a support matrix 11 can also include lower support joists (not shown), which support the upper panel rails thereupon. The determination of the exact configuration to be used will depend upon the desired size, and panel alignment in the overall panel support configuration. It should be noted that the optimum configuration for the depicted embodiments of the present invention require that tilt brackets 16 (in the form of C-channels) be installed before the rest of the support matrix (panel rails 30 and alignment locking rails 50) are installed with the tilt brackets 16 as support. It should also be noted that in the optimum forms of the depicted embodiments of the present invention, the upper panel rail 30 is constituted by Z-channels.

Figure 2:
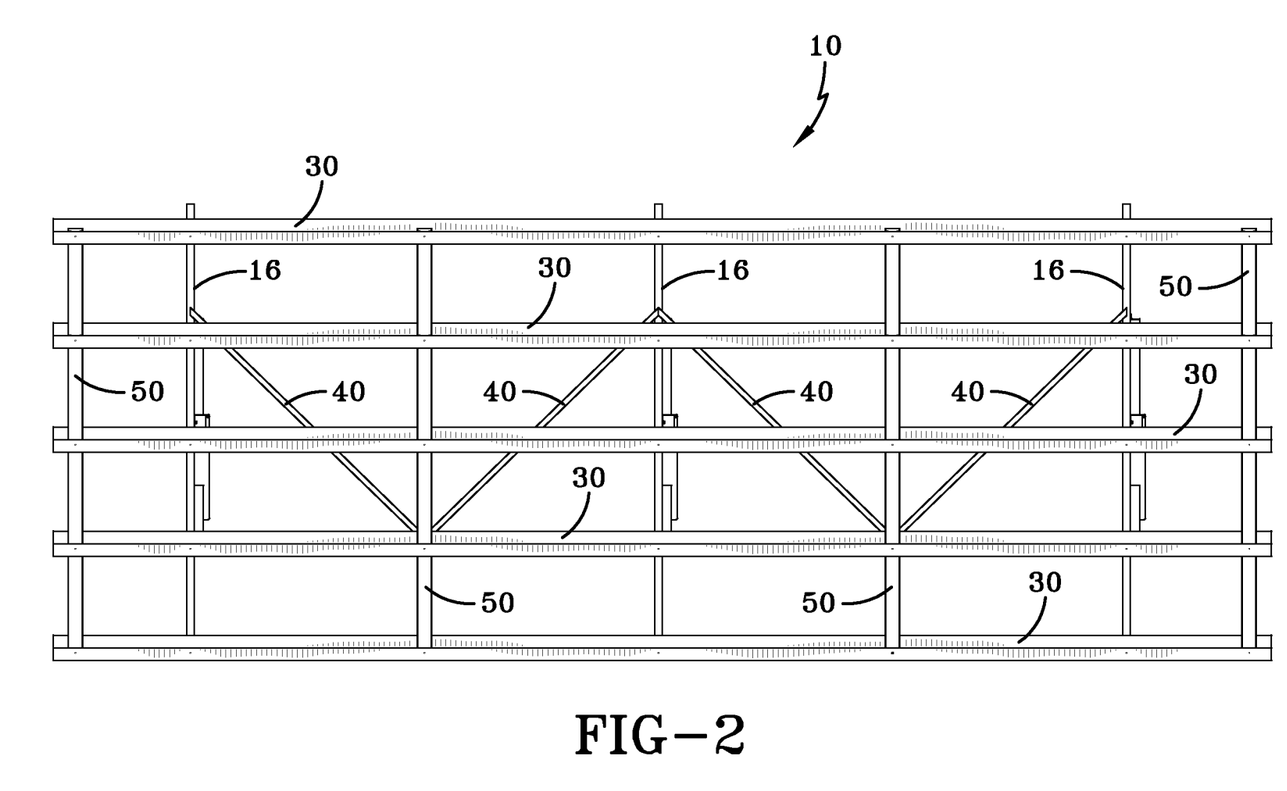
FIG. 2 is a top view of one arrangement in which the present invention operates.

One example is FIG. 2, depicting a "landscape" configuration. This particular configuration is chosen based upon a wide variety of parameters, including space available, weight, ground support capability, and irradiation angles. Under other circumstances, a "portrait" configuration could have been used instead, and the overall support system reconfigured to accommodate that particular configuration. Exemplarily support systems found in the present application have the flexibility to accommodate a wide variety of panel (especially solar panel) support arrangements. In the FIG. 2 embodiment there are three vertical supports 14 supporting three tilt brackets 16. There are four of the inventive alignment locking rails 50, along with four diagonal braces 40. It should be understood that this is simply a representative arrangement of one size and orientation of a solar panel support system 10.

Support system 10 is made from long, flexible, metal support members. The weight of these members, even when mutually supporting each other, will cause members to flex, bend and deform. The weight of the panels to be supported (not shown) will add to the forces that can deform the various structural members of support system 10. It should be understood that he the addition of the panels (12, not shown) adds a great deal of stiffness to the support array 10, even while adding weight. A major problem is that the panel support system 10 is subject to deformation and misalignment, especially due to environmental considerations, before the panels can be installed. This difficulty is addressed by the present invention, which provides an alignment arrangement that is suitable for the entirety of support system 10.

Figure 3:
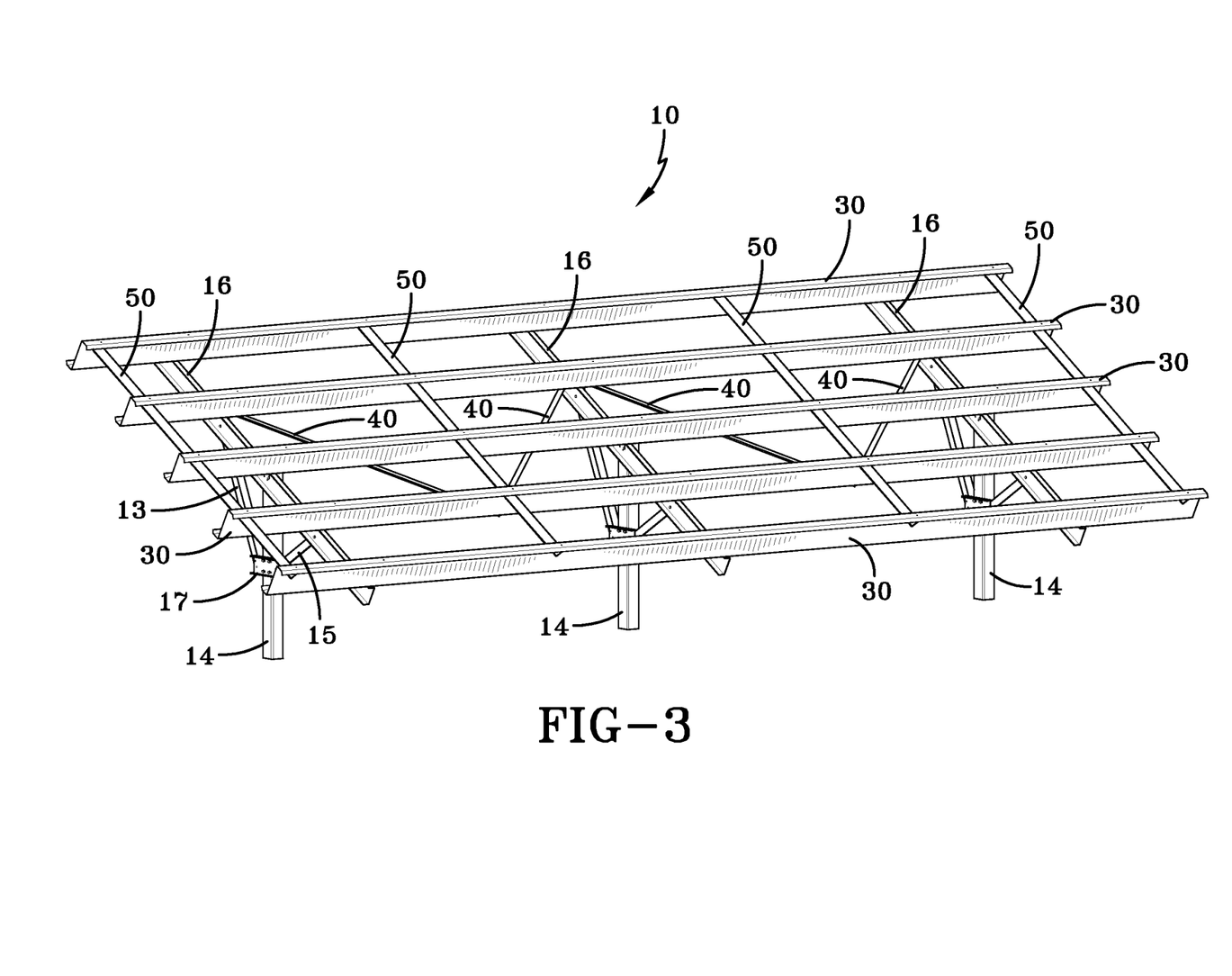
FIG. 3 is a perspective view of a panel support system in which the present invention operates.
Figure 4:
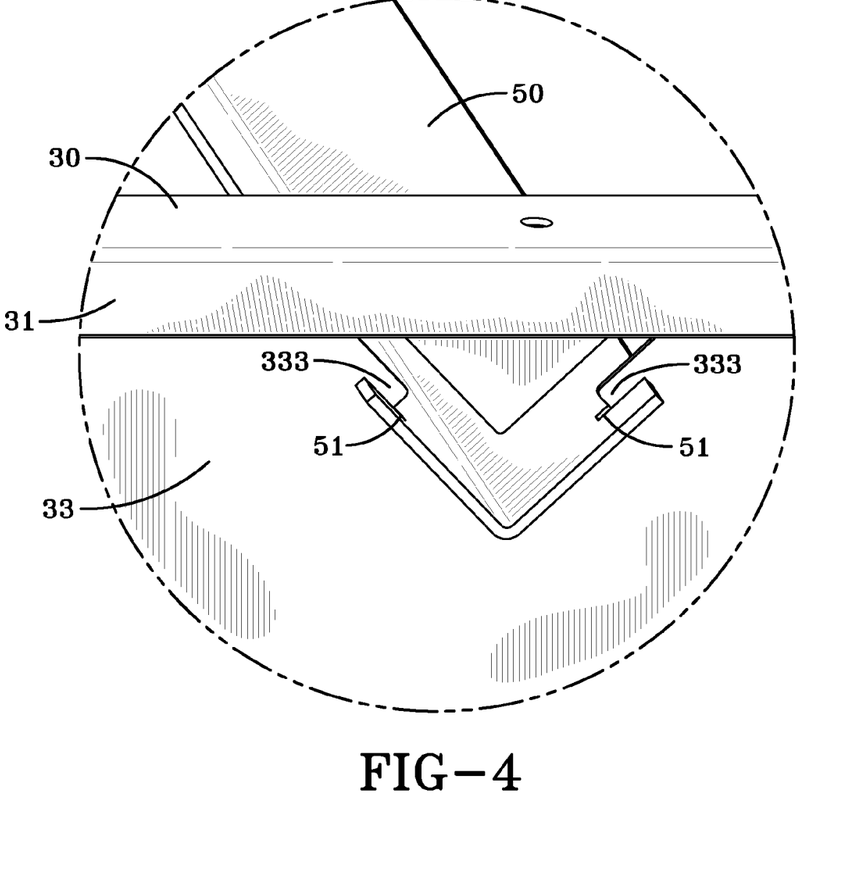
FIG. 4 is a detailed view of one portion of FIG. 3, depicting details of the present invention.

As depicted in FIGS. 3 and 4, four alignment locking rails 50 are arranged at various points along the width of support system 10. The alignment locking rails 50 are inserted through locking apertures in the connecting portion 33 of upper panel rails 30. It is noted that the upper panel rails 30 are preferably in the form of a z-channel. Each of the locking apertures 330 is located in the same place in the connecting portion 33 of each of the upper panel rails 30. In the arrangement depicted in the drawings, four alignment locking rails are used throughout support system 10. However, a greater number or a lesser number of alignment locking rails 50 can be used in any particular panel support system 10, depending upon the size of the panel support system 10, and the prevailing environmental conditions.

It should be noted that the alignment locking rails 50 constitute part of the support matrix 11 along with the upper panel rails 30, diagonal braces 40 and any other structural features that may be appropriate. It should be understood that the use of alignment locking rails 50 interlocking with the connecting portion 33 of the upper panel rails 30 serves to align the entirety of the support system 10 by holding all of the upper panel rails 30 in a predetermine position. With the panel rails held in a proper position, the overall support system 10 is strengthened since deformation is reduced throughout the entire support system 10.

While even a plurality of alignment locking rails 50 do not add substantial structural strength to the support matrix 11 by themselves, the alignment they provide to the overall support matrix 11 facilitates the optimum configuration of the support matrix 11 for supporting the panels 12 (not shown) to be mounted on the support matrix 11.

The capability of the inventive alignment locking rails 50 to hold the entire panel support matrix 11 in a proper alignment, thereby strengthening the overall panel support system 10 lies in the fact that each of the upper panel rails 30 connects securely to a common alignment locking rail 50. Each of the upper panel rails 30 has at least one locking aperture 330, through which the alignment locking rail 50 passes and connects to the upper panel rail 30.

Figure 5:
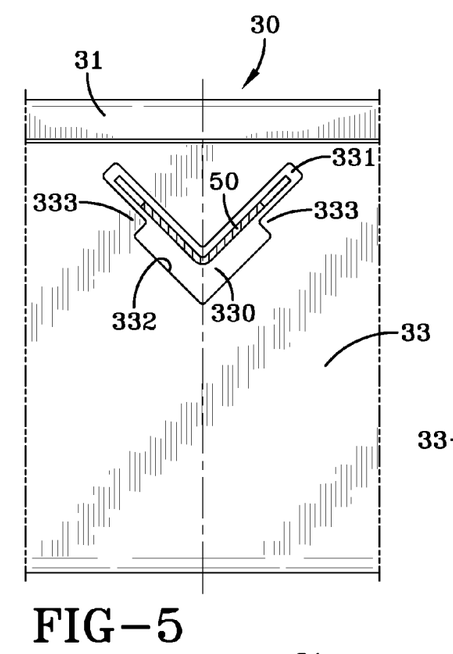
FIG. 5 is a front view of a support member configured in accordance to the alignment system of the present invention.

Preferably, as depicted in one embodiment of the present invention, all of the upper panel rails 30 are Z-channels or purlins. The locking apertures 330 are located in exactly the same location for each of the Z-channel upper panel rails 30. The locking apertures 330 are configured in a double V pattern with an upper V opening 331 and a lower V opening 332. The two V-shape apertures are essentially separated from each other by way of wall angles 333. These wall angles are configured to interface with locking notches 51 on the alignment locking rail 50. The upper v-shape aperture 331 allows the v-shaped alignment locking rail 50 to easily pass through the Z-channel upper panel rail 30. The alignment locking rail is formed by a V-channel, preferably having a substantially 90° angle between the two arms of the V-channel.

As previously indicated, the upper, V-shape aperture 331 is large enough to allow easy passage of the V-shaped alignment locking rail 50. The lower, V-shaped aperture 332 is sufficiently deep to allow the alignment locking rail 50 to be twisted as it is lowered into the lower V-shaped aperture 332 by interfacing the locking notches 51 with first one wall angle 333 and then the second wall angle 333.

Figure 6:
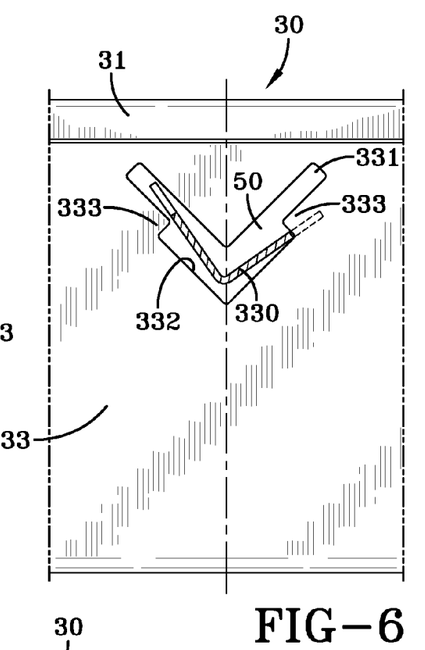
FIG. 6 is a front view of a support member configured in accordance to the present invention, and depicting one position of the alignment locking rail with respect to the support member.

FIG. 6 depicts the twisting of the alignment locking rail 50 by inserting one wall angle 333 into a first locking notch 51. This is clearly depicted in FIG. 6. The space provided in the two V-shaped apertures 331, 332 allows room for the alignment locking rail 50 to be shifted up and down and twisted so that wall angles 333 can be placed in a first locking notch 51 and then a second locking notch 51. Once this is accomplished, the alignment locking rail 50, fits closely in the bottom of the lower V-shaped aperture 332 as depicted in FIG. 7.

Figure 7:
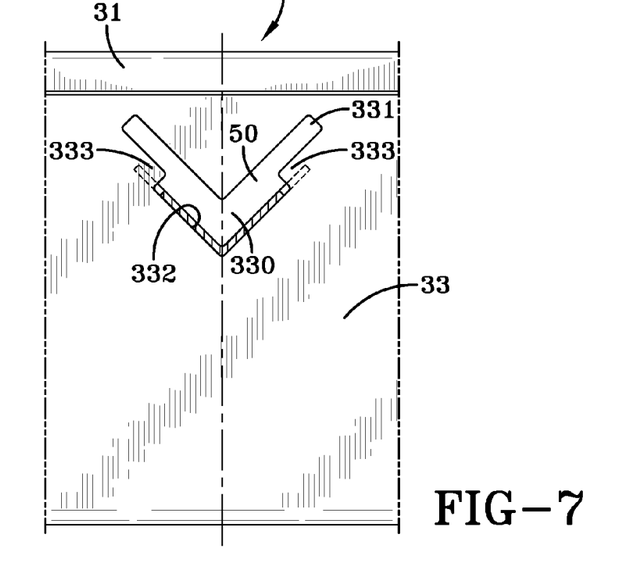
FIG. 7 is a front view of a support member configured in accordance with the present invention in which the alignment locking rail is depicted in a fully locked position.
Figure 8:
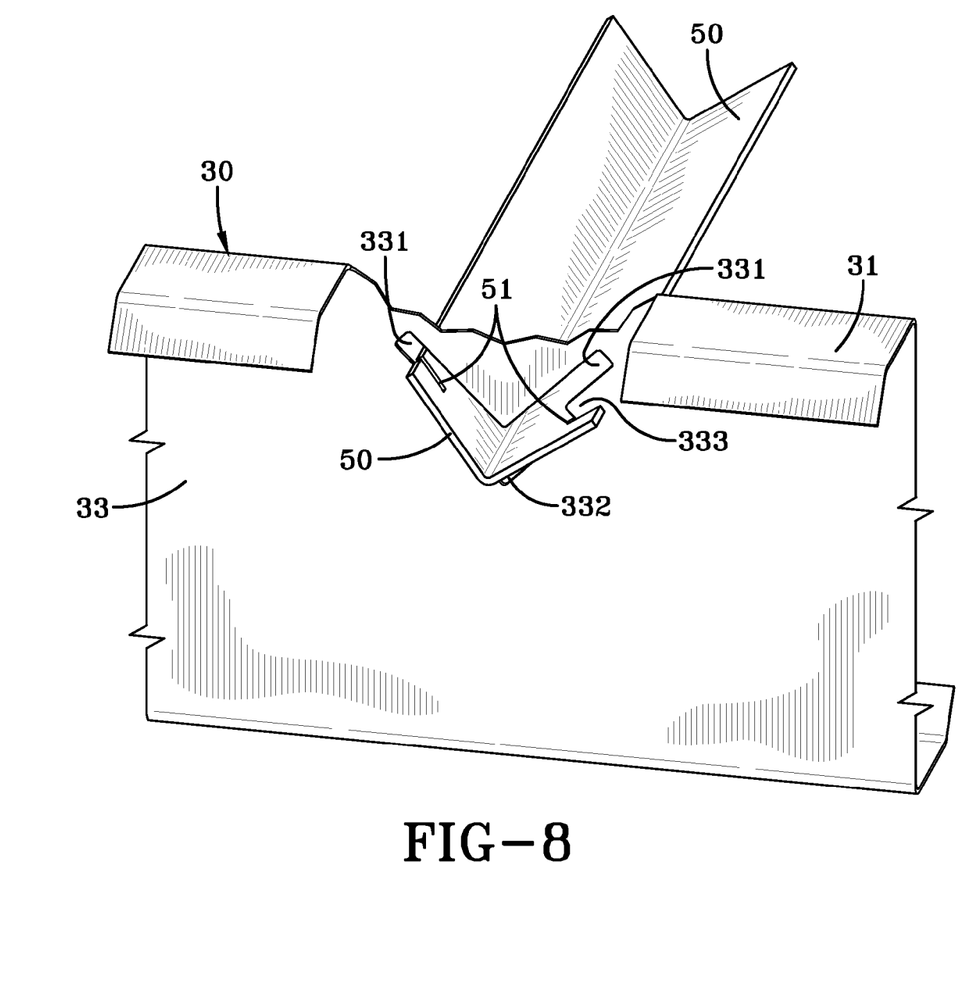
FIG. 8 is a front view of a support member configured in accordance with the present invention, depicting a perspective view of the alignment locking rail having one locking notch engaged with a complementary wall angle on the support member.

FIG. 8 is a perspective view of an alignment locking rail 50 being twisted so that wall angle 333 can be interlocked with one of the locking notches 51 on one side of the V-shaped alignment locking rail 50. At the same time, the other side of the V-channel arrangement of the alignment locking rail remains raised in the upper V-shaped aperture 331. Once a first locking notch 51 interfaces with one wall angle 333 as depicted in FIG. 8, the alignment locking rail 50 can be twisted and lowered so that the second locking notch 51 will interface with a second wall angle 333 to provide the configuration depicted in FIG. 7.

Figure 9:
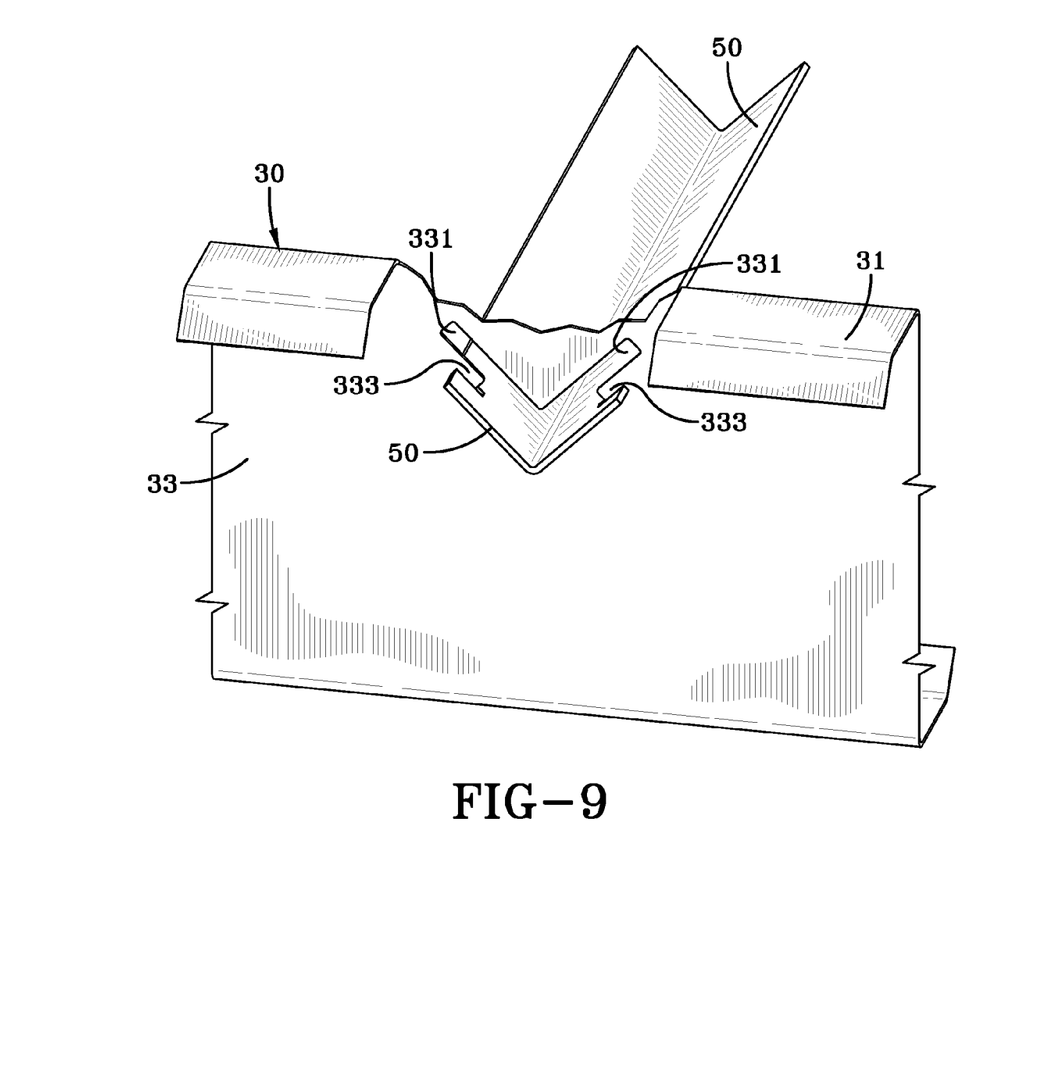
FIG. 9 is a front view of a support member configured in accordance with the present invention, and depicting a partial perspective view of an alignment locking rail positioned so that a second locking notch engages with a second wall angle of the support member.

FIG. 9 is a perspective view of the alignment locking rail 50 when in the position depicted by the side view of FIG. 7. In this arrangement, both of the locking notches 51 interface securely with each of the wall angles 333 so that the locking rail 50 and the z-channel upper panel rail 30 are securely locked together. This means that that particular upper panel rail 30 is securely held in proper alignment to better facilitate installation of the panels (12, not shown). By holding all of the upper panel rails 30 in proper alignment using alignment locking rails 50, the entire support matrix 11 is kept aligned under all circumstances so that the panels (12, not shown) can be easily installed in correct alignment.

If necessary, alignment locking rail 50 can be detached from each of the upper panel rails 30 in the same manner in which the alignment locking rail was originally connected.

The panel arrangement in the first preferred embodiment, as depicted in FIGS. 2 and 3, permits in a number of different arrangements for holding panels 12 to the Z-shaped channel upper panel rails 30. One preferred example is found in FIG. 10B.

Figure 10A:
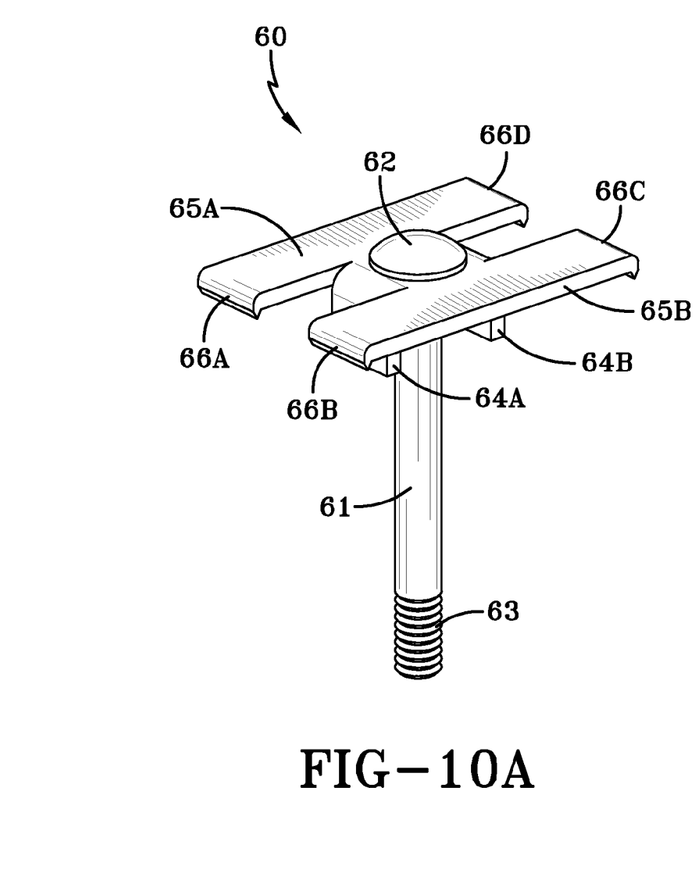
FIG. 10A is a perspective view of a panel clip or clamp configured to operate one configuration of the present invention.
Figure 10B:
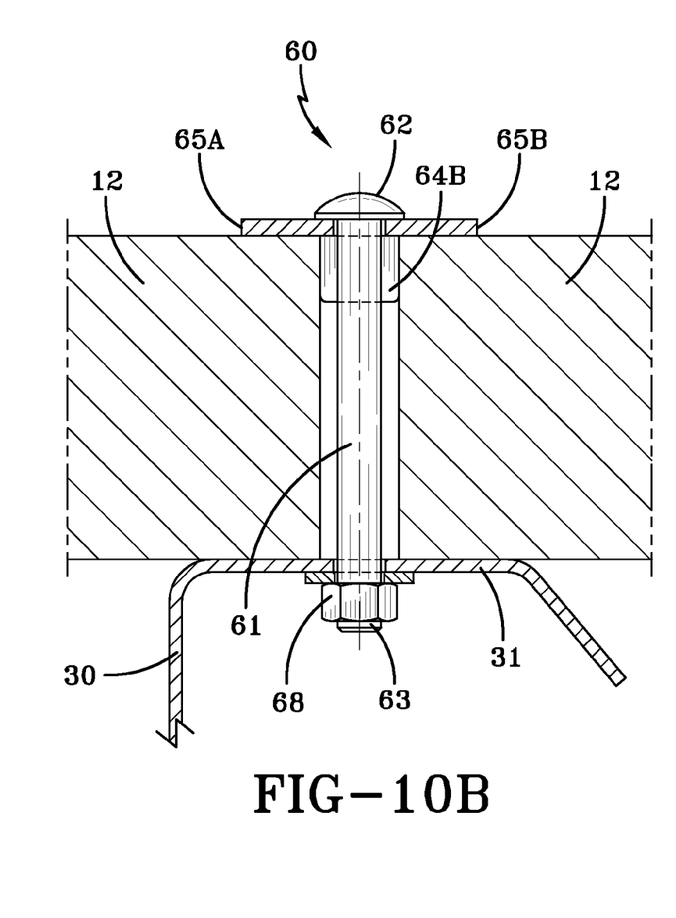
FIG. 10B is a side view of the panel clamp of FIG. 10A deployed between two abutting panels.

This panel arrangement is best addressed by mid-clamp assembly panel clip 60 (clip 60), as depicted in FIG. 10(a). Panel clip 60 includes a shaft 61 with a threaded portion 63. A head 62 overlies a pair of holding arms 65(a), 65(b). Between the two holding arms 65(a), 65(b) are tabs 64(a) and 64(b), extending downward between the holding arms. Each of the holding arms 65(a) and 65(b) has a double termination in a grounding edge 66(a), 66(b), 66(c) and 66(d). These grounding edges dig into panel 12 when an external nut 68, or other connector suited for the threaded portion 63 is connected thereto, thereby holding clip 60 to the upper portion 31 of Z-channel panel rail 30.

Tabs 64(a) and 64(b) serve to separate panels 12 at a correct distance therebetween. The aperture through which shaft 61 passes is located on the upper portion 31 of Z-channel panel rail 30 so that the two abutting panels 12 each receive appropriate support.

The grounding edges 65(a-d) serve to provide proper electrical grounding between the panel 12 frames and the rest of the panel support system 10. Likewise, the grounding edges 66(a-d) also provide an excellent mechanical gripping device to better hold panels 12 in place. It is expected that the Z-channel upper panel rails 30 will be appropriately drilled on their upper portions 31 so that assembly of the panels 12 onto the panel matrix 11 (via the upper portion 31 of the Z-channel panel rail 30) will facilitate quick and accurate assembly of the panels 12 to the panel support system 10. While panel clip 60 provides a very effective holding arrangement between panels 12, it is not entirely appropriate at the ends of the panel array. Accordingly, additional arrangements are required to optimize the holding capability of the panels at the ends of the panel array.

Figure 11A:
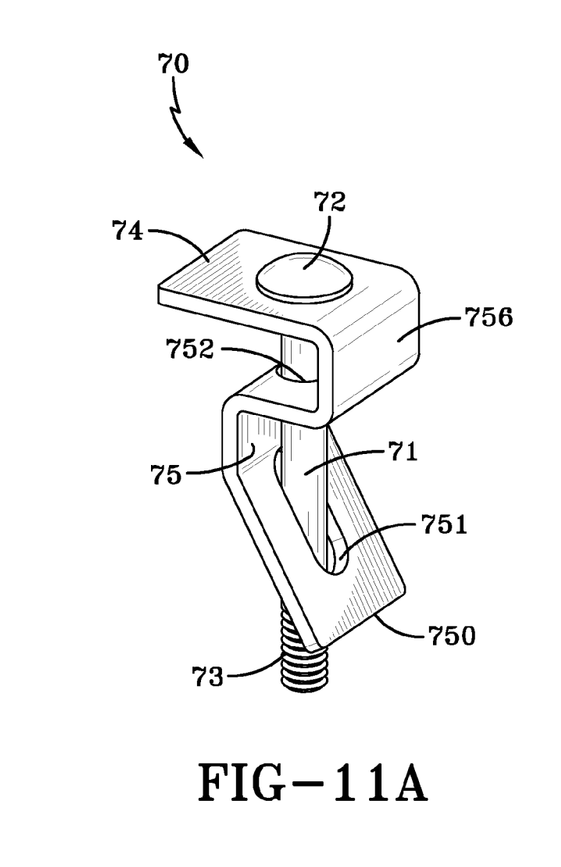
FIG. 11A is a perspective view of a second panel clip or clamp figured specifically to operate with another configuration of the present invention.
Figure 11B:
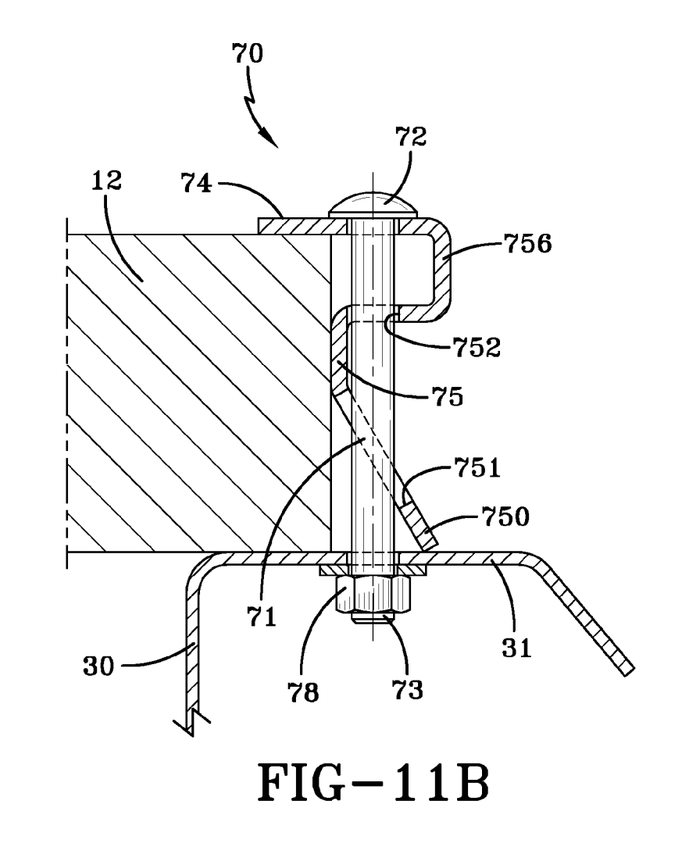
FIG. 11B is a side view of the panel clamp of FIG. 11A, operating to hold a panel in another configuration of the present invention.

FIG. 11A depicts an end clamp assembly panel clip 70 (clip 70). Holding arm 74 is used to hold the edge of panel 12, as depicted in FIG. 11B. A shaft 71 with a head 72 passes through the holding arm. This holding arm 74 is connected via connecting piece 756 to spring section 75, which is the form of an elongated S-shape. Shaft 71 passes through aperture 752 in the middle of the spring portion 75. The shaft 71 also passes through an elongated aperture or slot 751.

When clip 70 is placed into position as depicted in FIG. 11B, tightening of clip 70 with respect to the upper portion 31 of upper panel rail 30, using nut 78, will force the spring portion 75 to flex. This flexing is permitted due to the elongated aperture or slot 751. The force generated in the spring portion 75 by the tightening of nut 78 forces holding arm 74 tightly against the top of panel 12. This spring action serves to provide a very tight hold at the end of the panel array, without additional expedients. The correct location of aperture through the upper portion 31 of Z-channel upper panel rail 30 provides sufficient support for panel 12, while also providing sufficient room for the end of the spring portion 75 to be supported by the upper portion 31 of the Z-channel panel rail 30.

It should be understood that a Z-channel panel rail 30 is the first preferred embodiment of the present invention since the arrangement of the Z-channel permits access to bolts beneath the panel clips (60, 70). This means that tightening of the bolts (68, 78) is all that need be done to properly position and hold panels 12 in this particular embodiment of the present invention.

It should be understood that while a Z-channel panel rails 30 are preferred, other types of panel rails that can be used. However, many known designs of panel rail would not offer particularly good access for tightening nuts on shafts that hold panel clips. Further, double connecting wall arrangements (such as those for tubular panel rails) would also present problems when connecting the alignment locking rails. Also, such closed tubular arrangements would require longer shafts to hold the panel clips in order to achieve access to the threaded part of the shafts of the two tightening nuts. Consequently, there are structural constraints on the best arrangements to optimize the various aspects of the present invention.

It should be understood that the present invention admits to many variations within a general concept thereof. Therefore, the present invention should be understood to include any and all variations, derivations, modifications, embodiments, adaptations, permutations and adjustments that would occur to one skilled in this technology, and being in possession of the teachings of the present invention. Accordingly, the present invention should be construed to be limited only by the following claims.

We claim:

1. A panel support array arranged to support and hold at least one external panel, said panel support array comprising:
    a) a lower support structure;
    b) a plurality of upper panel rails attached to said at least one external panel and, arranged on said lower support structure, each said upper panel rail comprising an upper surface configured to support said at least one external panel, and at least one side plate arranged beneath said upper surface, wherein each said side plate comprises at least one V-shaped opening aligned with at least one V-shaped opening in at least one said side plate of an adjacent upper panel rail; and,
    c) at least one alignment rail comprising two arms configured to fit into said V-shaped openings of adjacent ones of said upper panel rails, wherein said at least one alignment rail and each of said V-shaped openings of said side plates of said adjacent upper panel rails comprise an interface structure configured to lock said alignment rail to each said adjacent upper panel rail to secure the adjacent upper panel rails in a parallel space relationship by engaging said at least one alignment rail at each of said corresponding V-shaped openings of said adjacent upper panel rails, said interface structure comprising locking notches in one or both arms of said at least one alignment rail and said locking notches are spaced and aligned to seat and hold an edge portion of the corresponding side plate of each of said adjacent upper panel rails when said rails are in parallel spaced relationship.

2. The panel support array of claim 1, wherein alignment between adjacent upper panel rails is maintained when said interface structure locks said alignment rail to said adjacent upper panel rails.

3. The panel support array of claim 2, wherein said edge portion comprises a wall angle formed in each side of said respective V-shaped openings in said side plates, thereby effecting each V-shaped opening to have at least two widths.

4. The panel support array of claim 3, wherein said locking notches are configured to interface with said wall angles so that said wall angles fit within said locking notches when said interface structure locks said alignment rail to said adjacent and parallel spaced upper panel rails.

5. The panel support array of claim 4, further comprising a plurality of said alignment rails.

6. The panel support array of claim 5, comprising more than two upper panel rails.

7. The panel support array of claim 6, wherein said lower support structure comprises at least a pair of tilt brackets upon which said upper panel rails are supported.

8. The panel support array of claim 7, further comprising at least one diagonal support spanning at least two upper panel rails.

9. The panel support array of claim 1, further comprising a panel clip assembly configured to hold and separate two adjacent external panels to the upper panel rail, said panel clip assembly comprising:
    a) two upper panel holding structures in a common plane;
    b) two separating tabs arranged between two said upper panel holding structures, and extending substantially perpendicular thereto; and,
    c) a connecting structure extending between said two upper panel holding structures perpendicular to said common plane.

10. The panel support array of claim 9, further comprising an aperture in said connecting structure.

11. The panel support array of claim 10, wherein the connecting structure further comprises a connector passing through said aperture and connects to said upper panel rail, and said panel clip assembly is sized to span said external panels so that each of said two upper panel holding structures engage one of said two separated and held adjacent external panels.

12. The panel support array of claim 9, wherein each of said upper panel holding structures comprises at least one grounding edge.

13. The panel support array of claim 12, wherein each of said upper panel holding structures spans said two separated and held adjacent external panels.

14. The panel support array of claim 1, further comprising a spring clamp assembly configured to hold an external panel to the upper panel rail of the support array, said spring clamp assembly comprising:
    a) an upper panel holding portion having a first aperture;
    b) a spring structure formed in a substantially S-shaped configuration, extending from said upper panel holding portion, said spring structure comprising an upper aperture and an extended aperture; and,
    c) a connector configured to extend through said first aperture in said upper holding structure and through said upper and extended apertures in said spring structure.

15. The panel support array of claim 14, wherein said spring structure comprises a lower portion configured to contact said upper panel rail and apply a spring force against a head of the connector when said connector is tightened to said upper panel rail.

16. The panel support array of claim 15, wherein said lower portion of the spring structure is formed to be substantially straight, and comprises said extended aperture.

17. The panel support array of claim 16, wherein said spring structure exhibits pressure on a sidewall of said external panel when said connector is tightened to said upper panel rail.

* * * * *